United States Patent [19]

Hovens

[11] Patent Number: 4,949,178

[45] Date of Patent: Aug. 14, 1990

[54] COINCIDENCE CIRCUIT IN A LINE SYNCHRONIZING CIRCUIT ARRANGEMENT

[75] Inventor: Paulus J. M. Hovens, Eindhoven, Netherlands

[73] Assignee: U.S. Philips Corporation, New York, N.Y.

[21] Appl. No.: 35,107

[22] Filed: Apr. 6, 1987

[30] Foreign Application Priority Data

Apr. 15, 1986 [NL] Netherlands .......................... 8600945

[51] Int. Cl.⁵ .............................................. H04N 5/04
[52] U.S. Cl. .................................... 358/149; 358/148; 358/158
[58] Field of Search ........................ 358/158, 148, 149

[56] References Cited

U.S. PATENT DOCUMENTS 4,251,833 2/1981 Fernsler et al. ...................... 358/158

Primary Examiner—Edward L. Coles, Sr.
Assistant Examiner—David E. Harvey
Attorney, Agent, or Firm—Bernard Franzblau

[57] ABSTRACT

A coincidence circuit in a line synchronizing circuit arrangement for a picture display device. The coincidence circuit detects a coincidence state of an incoming line synchronizing signal which originates from a synchronizing signal separator, and a locally generated line signal which originates from a line oscillator. The coincidence circuit comprises a first coincidence detector which is operative during the field blanking interval and which comprises a source activated by the incoming line synchronizing signal for modifying the quantity of information which is stored in storage means. The line synchronizing signal is effectively inhibited in the coincidence state of the coincidence detector and is uninhibited in the non-coincidence state by the locally generated line signal. A second coincidence detector is operative during the field trace time and comprises a third source activated by the incoming line synchronizing signal for modifying the quantity of information which is stored in the storage means. The third source is enabled by the locally generated line signal in the coincidence state of the second coincidence detector, but is not enabled in the non-coincidence state.

12 Claims, 2 Drawing Sheets

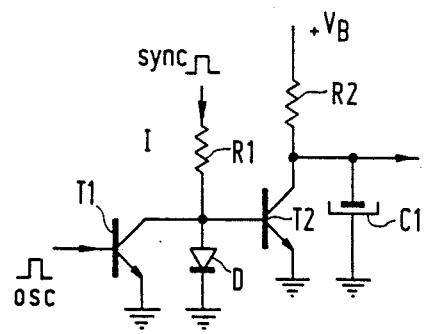
FIG.1
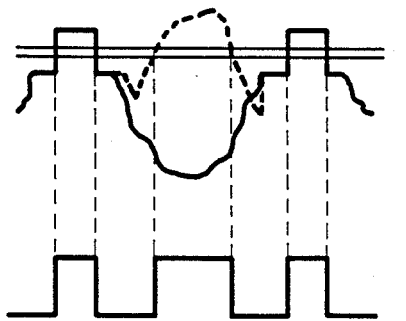
FIG.2a
FIG.2b
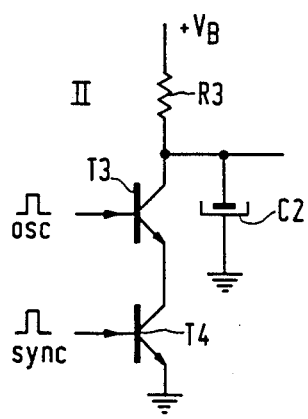
FIG.3

COINCIDENCE CIRCUIT IN A LINE SYNCHRONIZING CIRCUIT ARRANGEMENT

BACKGROUND OF THE INVENTION

This invention relates to a coincidence circuit in a line synchronizing circuit arrangement for a picture display device for establishing a coincidence state of an incoming line synchronizing signal which originates from a synchronizing signal separator, and a locally generated line signal which originates from a line oscillator, said coincidence circuit comprising a coincidence detector which is only operative during part of the field period, and storage means which are coupled to an output of the coincidence detector.

A line synchronizing circuit arrangement of this type is known from European Patent Application 91,719, which corresponds to U.S. Pat. No. 4,535,358. In this patent the circuit arrangement is switchable between two states by means of the coincidence circuit, in which the pull-in time of the line oscillator has different durations. Other uses of a coincidence circuit are known: some are described in U.S. Pat. No. 4,520,393 in which a number of switching possibilities is mentioned, including, inter alia, switching of the synchronizing signal separator. As a rule a switch-over takes place when the coincidence circuit has established a coincidence state, i.e. that coincidence between the signals applied thereto has occurred one or more times, a coincidence being understood to be the at least partly simultaneous occurrence of an incoming line synchronizing pulse and a line oscillator pulse.

The coincidence circuit described in the European patent applicated cited above comprises a concidence detector which is inoperative during the field blanking interval in order to avoid an interference which might occur in this interval due to the field synchronizing pulses. In fact, since these pulses are broader tha the line synchronizing pulses, the quantity of information stored in the storage means, for example, a capacitor, could reach the decision level at which the said switch-over takes place. This erroneous situation could still prevail at the end of the field blanking interval so that an interference would be visible at the top of the displayed picture.

However, during the rest of the field period, the field trace time, another interference may occur, namely an interference produced upon reception of television signals with echo and/or adjacent channel signals. In the case of such a reception video signal remnants having a phase which is arbitrary with respect to the line synchronizing signal may reach the synchronizing signal separator. Interference signals may then be supplied by the separator to the coincidence detector, together with the useful synchronizing signal derived from the incoming video signal. It is found that the coincidence detector has been often incapable of making a usable distinction between such a disturbed state and the state in which such interference signals are absent, with the result that the line synchronizing circuit arrangement can switch over prematurely, which is a serious disturbance of the operation of this circuit arrangement.

SUMMARY OF THE INVENTION

An object of the invention is to provide a coincidence circuit of the type described above, which has little sensitivity to the above-mentioned disturbance and to this end the coincidence circuit according to the invention is characterized in that the coincidence detector is formed with a source (device) activated by the incoming line synchronizing signal for modifying the quantity of information which is stored in the storage means, the line synchronizing signal being inhibited in the coincidence state of the coincidence detector and being uninhibited in the non-coincidence state by the locally generated line signal and the source (device) being enabled during the field blanking interval.

The invention is based on the recognition that such a coincidence detector, which is sensitive to disturbances caused during the field trace time by echo and/or adjacent channel signals, is much less sensitive to such disturbances during the field blanking interval; more specifically because the incoming video signal predominantly comprises black information during this interval so that the separated synchronizing signal then comprises much fewer disturbing video signal remnants than during the field trace time. The coincidence detector according to the invention is only operative during the said interval, which is in contrast to the coincidence detector in the European Patent Application 91,719 cited above. However, by suitable dimensioning it can be realized that the interference caused by the broad field synchronizing pulses does not occur or at least no longer occurs at the end of the field blanking interval. Consequently the coincidence detector is slower than was otherwise the case. In addition the detector is only operative during a small part of the time. These two facts may be undesirable. Therefore, the circuit according to the invention is preferably characterized in that the coincidence circuit comprises a second coincidence detector which is formed with a third source (device) activated by the incoming line synchronizing signal for modifying the quantity of information which is stored in the storage means, the line synchronizing signal being enabled in the coincidence state of the second coincidence detector and not being enabled in the non-coincidence state by the locally generated line signal, and the third source (device) being inhibited during the field blanking interval.

An erroneous operation in the case of echoes is obviated with this circuit, more specifically because only the first coincidence detector is operative during the field blanking interval, while a good interference insensitivity is obtained during the field trace time in which only the second coincidence detector is operative.

BRIEF DESCRIPTION OF THE DRAWINGS

The invention will be further described by way of example with reference to the accompanying drawing, in which:

FIG. 1 shows the principal circuit diagram of a first circuit which may serve as a coincidence detector, FIG. 2 shows the video signal which is applied to a known synchronizing signal separator and the signal derived therefrom, which is applied to a coincidence detector, FIG. 3 shows the circuit diagram of a second circuit which may serve as a coincidence detector.

DETAILED DESCRIPTION OF THE INVENTION

Figure 4:
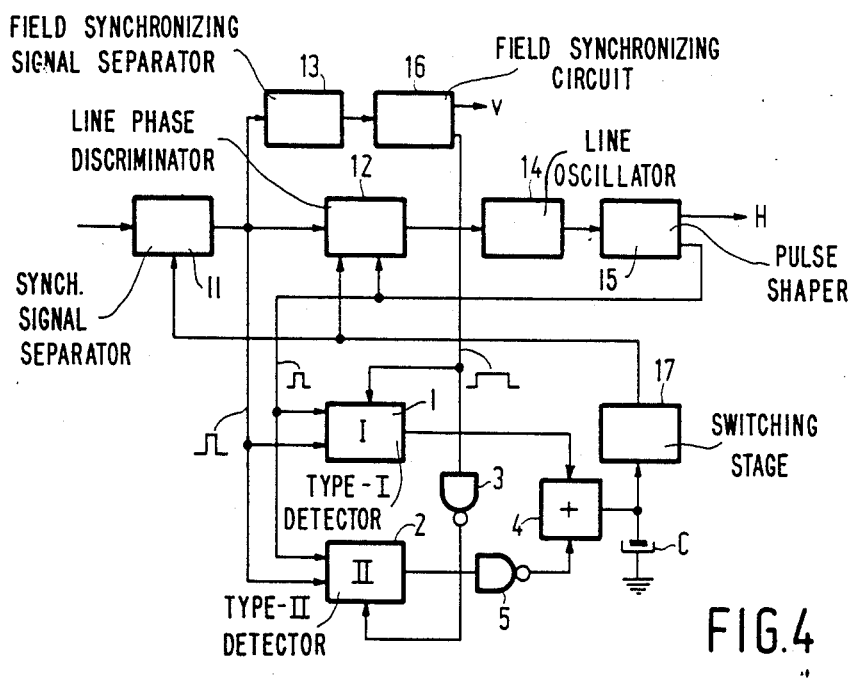
FIG. 4 shows the block diagram of the relevant part of a picture display device including a coincidence circuit according to the invention and, FIG. 5 shows the circuit diagram of a coincidence circuit according to the invention.

FIG. 1 shows a coincidence detector which may be used for establishing the coincidence state of an incoming line synchronizing signal and a locally generated line signal in a line synchronizing circuit arrangement for a picture display device, for example, a television receiver. The coincidence detector of FIG. 1 has two npn-transistors T1 and T2. The two emitters are connected to ground. The locally generated signal is applied to the base of transistor T1, namely a signal which is derived from the signal of a line oscillator forming part of the said line synchronizing circuit arrangement, which signal is brought into synchronism in a known manner and is subsequently maintained in synchronism with the incoming line synchronizing signal. The local line signal may originate, for example, from a line transformer. The line synchronizing circuit arrangement may comprise an oscillator whose frequency is higher than the line frequency and a frequency divider circuit supplying a signal at the line frequency in the synchronous state.

The collector of transistor T1 is connected to the base of transistor T2, to a resistor R1 and to the anode of a current mirror diode D whose cathode is connected to ground. The other connection of resistor R1 is connected to a source for supplying the line synchronizing signal, for example, a synchronizing signal separator of known type. The collector of transistor T2 is connected to a resistor R2, the other connection of which is connected to a positive supply voltage $V_B$. The collector of T2 is also connected to a capacitor C1. The negative rail of voltage $V_B$ and the other connection of capacitor C1 are connected to ground.

When the two input signals of the detector of FIG. 1 do not occur simultaneously, transistor T1 is first rendered conducting by a positively directed oscillator pulse. As a result transistor T2 is rendered non-conducting. A small charge current for a capacitor C1 flows through resistor R2. A subsequent positively directed line synchronizing pulse renders transistor T2 conducting so that capacitor C1 is discharged by a large current. In this non-coincidence state the voltage across the capacitor is thus either substantially zero or very low. This voltage is utilized for maintaining a switching stage, not shown, which comprises, for example, a level detector, in a state in which the line synchronizing circuit arrangement has a high pull-in rate and a wide pull-in range. When the input signals to the coincidence detector do occur, at least partly simultaneously, transistor T2 is maintained in the non-conducting state by the oscillator pulse during the time when the synchronizing pulse would produce a base current. Consequently the operation of transistor T2 is inhibited and capacitor C1 is slightly charged. When such a coincidence occurs a given number of successive times, the voltage across capacitor C1 exceeds a predetermined value so that a switch-over is effected for decreasing the sensitivity and hence for increasing the interference insensitivity of the line synchronizing circuit arrangement. An example of a line synchronizing circuit arrangement with a similar switching facility is described in U.S. Pat. No. 4,535,358 whose test is incorporated herein by reference, but which, however, does not describe the structure of the coincidence detector.

It appears from the foregoing that the coincidence detector of FIG. 1 is formed with a discharge source for capacitor C1 which in the case of non-coincidence is operative under the influence of the line synchronizing pulses. In the case of coincidence these pulses are inhibited so that discharging does not take place and the synchronous state of the line synchronizing circuit arrangement is initiated after a given number of line periods. It will be evident to those skilled in the art how the circuit of FIG. 1 can be formed with digital means. For example, the supply of the input signals can be formed with an AND-gate, while the line synchronizing pulses are positively directed and the oscillator pulses are negatively directed and capacitor C1 and the level detector connected thereto may be replaced by a memory and a counter.

A drawback of the coincidence detector of FIG. 1 is that it is sensitive to interference which may occur upon the reception of television signals with echo and/or adjacent channel signals. FIG. 2a shows the video signal which is applied to a synchronizing signal separator of known type, for example, the separator described in U.S. Pat. No. 4,520,393. Using a peak detector and a reference level detector, the separator derives a slice from the video signal whose level is present between the level of the peak of the synchronizing pulse and the black level. This slice is amplified in order to obtain the regenerated synchronizing signal which is applied to the line synchronizing circuit arrangement and to the coincidence detector. When television signals are received which comprises echo and/or adjacent channel signals, an interference signal may be superposed on the useful video signal of FIG. 2a, which is a video signal having a phase which is arbitrary with respect to the useful signal, for examplde, the inverted phase under certain circumstances. Such an interference signal is shown by means of a broken line in FIG. 2a. It is apparent therefrom that not only the synchronizing signal is being cut through transversely, but also a video signal is being cut so that the output signal of FIG. 2b is obtained. Transistor T2 thus is maintained in a conducting state during a large portion of the line period. The voltage across capacitor C1 thus remains low and indicates a non-coincidence state although this may not be true. In other words, the coincidence detector does not make a distinction between the non-coincidence state and the disturbed state shown of the synchronizing signal separator. The result thereof may be that the line synchronizing circuit arrangement prematurely switches over to the non-synchronous state so that the interference sensitivity of this circuit arrangement is increased. This sensitivity is increased even more if the line synchronizing circuit arrangement in the synchronizing state is only operative during the occurrence of a line frequency keying pulse and in the non-synchronous state is operating during the entire line period. The said U.S. Pat. No. 4,520,393 describes such a switch-over.

A coincidence detector may be alternatively formed as shown in FIG. 3, namely with two npn-transistors T3 and T4 whose collector-emitter paths are arranged in series with each other, while the base of one of the transistors receives one of the input signals and the base of the other transistor receives the other input signal. The emitter of transistor T4 is connected to ground and a resistor R3 is incorporated between the collector of transistor T3 and the positive rail of voltage $V_B$. The output signal of the detector is the voltage across a capacitor C2 which is connected between the collector of transistor T3 and ground. The detector of FIG. 3, which may be considered as a NAND-gate, has a high output voltage in the non-coincidence state in which state the transistors do not conduct, while capacitor C2 is charged by a small current, and it has a low output voltage in the coincidence state in which state capacitor C2 is discharged by a large current which also flows through the two transistors. If the signal originating from the synchronizing signal separator has a variation as is shown in FIG. 2b, the interference signal occurring during the line trace time does not have any influence because only information coinciding with the oscillator signal is passed on. A disturbed state of the synchronizing signal separator is thus not recognized. In fact, the coincidence detector recognizes such a state as a coincidence state, even when a non-coincidence state is actually concerned. Consequently, the detector of type II of FIG. 3 cannot be used without any further measures either.

During the field blanking interval the incoming video signal predominantly comprises black information, and therefore the synchronizing signal comprises much fewer disturbing video signal remnants than during the rest of the time. Therefore, the circuit is formed in such a manner that a coincidence detector of type I, i.e., a detector in accordance with FIG. 1, is only operative during the said interval so that the above-described erroneous operation of this detector does not take place, that is to say, its output voltage always has the correct value with which a distinction between coincidence and non-coincidence can be made.

Since the field blanking interval covers a small portion of the time, more specifically of the order of 5% of the field period, the above-described measure implies that the information stored in capacitor C1 is changed comparatively seldom, if necessary. In addition a discharge current for capacitor C1 flows during the occurrence of the broad field synchronizing pulses, which current is not inhibited by the oscillator pulses so that the voltage across the capacitor becomes low. If the value of this voltage at the end of the field blanking interval, i.e. at the top of the displayed picture, is to have the correct value in the case of coincidence, i.e. a value which is higher than the decision level at which the switch-over to the non-synchronous state takes place, the capacitance of capacitor C1 must be given a high value. Consequently, the coincidence detector is slow, which may be undesirable. An improvement is obtained by combining a coincidence detector of type II with a coincidence detector of type I in the manner shown in FIG. 4. In this figure the reference numeral 1 is a detector of type I, i.e. with the elements T1, T2, R1, R2 and D of FIG. 1 and the reference numeral 2 denotes a detector of type II, i.e. with the elements T3, T4, and R3 of FIG. 3. Both detectors receive the same pulses as the corresponding detectors of FIGS. 1 and 3. In addition, a positively directed field blanking pulse is applied to detector 1 for activating (enabling) the detector. This pulse is inverted via an inverter stage 3 and the negatively directed blanking pulse obtained is applied to detector 2 for rendering this detector inoperative. The inverter stage 3 effectively provides a means for inhibiting the second coincidence detector 2 during the field blanking signal. The output signal of detector 1 is applied to an input of an adder stage 4 and the output signal of detector 2 is applied to an inverter stage 5. The inverted signal obtained is applied to another input of stage 4. A capacitor C, across which the output voltage of the coincidence circuit of FIG. 4 is present, is connected to an output of stage 4.

FIG. 4 also shows other parts, which are important for the invention, of the picture display device incorporating the present line synchronizing circuit arrangement. Reference numeral 11 denotes the synchronizing signal separator in FIG. 4 which receives a video signal and applies the synchronizing signal to a line phase discriminator 12, to a field synchronizing signal separator 13 and to the two coincidence detectors 1 and 2. The line oscillator 14 is controlled in known manner by discriminator 12. Oscillator 14 applies a signal to a pulse shaper 15 which supplies a line signal for the purpose of the horizontal deflection, as well as a line signal for discriminator 12 and the two coincidence detectors 1 and 2. The field synchronizing signal derived by separator 13 is applied to a field synchronizing circuit 16 which generates a field signal for the purpose of the vertical deflection, as well as the field blanking pulse for detectors 1 and 2. The voltage across capacitor C is applied to the switching stage 17. This stage ensures the switching operations in dependence upon the said output voltage, inter alia, in the synchronizing signal separator 11 and in the phase discriminator 12. Capacitor C of FIG. 4 replaces the capacitors C1 and C2 of FIGS. 1 and 3.

If the pulses applied to the detectors 1 and 2 coincide, detector 1 supplies a current during the field blanking interval each time for recharging capacitor C, while detector 2 is inoperative. During the subsequent field trace time detector 1 is inoperative, while the output signal of detector 2 is low and that of stage 5 is high so that capacitor C is still being recharged. The voltage across capacitor C is thus high. If the line synchronizing pulses and the oscillator pulses do not coincide, the output signal of detector 1 is a discharge current for capacitor C during the field blanking interval. During the subsequent field trace time the output signal of detector 2 is high and that of stage 5 is low so that the capacitor is not charged and its voltage is low. Consequently a usable measure for the switching operation is obtained with the circuit of FIG. 4, in which the capacitance of capacitor C need not be too high so that the coincidence circuit is not too slow. It will be evident that the operation is the same if the inverter stage is not incorporated between detector 2 and stage 4 but between detector 1 and stage 4.

If a disturbed state occurs in the case of coincidence in which a signal as in FIG. 2b is presented to detectors 1 and 2, detector 1 still supplies a high signal during the field blanking interval and during the subsequent field trace time, when detector 1 is inoperative, the output signal of detector 2 is low so that capacitor C is charged each time due to the inversion by means of stage 5. This is the same situation as without interference. In the case of non-coincidence detector 2 indicates a coincidence state during the field trace time, with the result that capacitor C is charged each time, but during the subsequent field blanking interval the capacitor is discharged again by detector 1 during the occurence of the line synchronizing pulses. A sawtooth-shaped voltage with a rising edge is present across the capacitor during the trace and a falling edge during blanking. A suitable dimensioning may result in capacitor C being discharged to a greater extent during blanking than in being charged during the trace and consequently the maximum value assumed by the sawtooth-shaped voltage at the end of the trace time is not higher than the threshold value for which an undesired switching to the synchronous state of the line synchronizing circuit arrangement would take place. This is the same sitution as without interference. A faulty operation in the case of echoes is obviated with the circuit of FIG. 4, more specifically because only detector 1 operates during the field blanking interval, while a satisfactory interference insensitivity is obtained, more specifically because only detector 2 operates during the field trace time.

Figure 5:
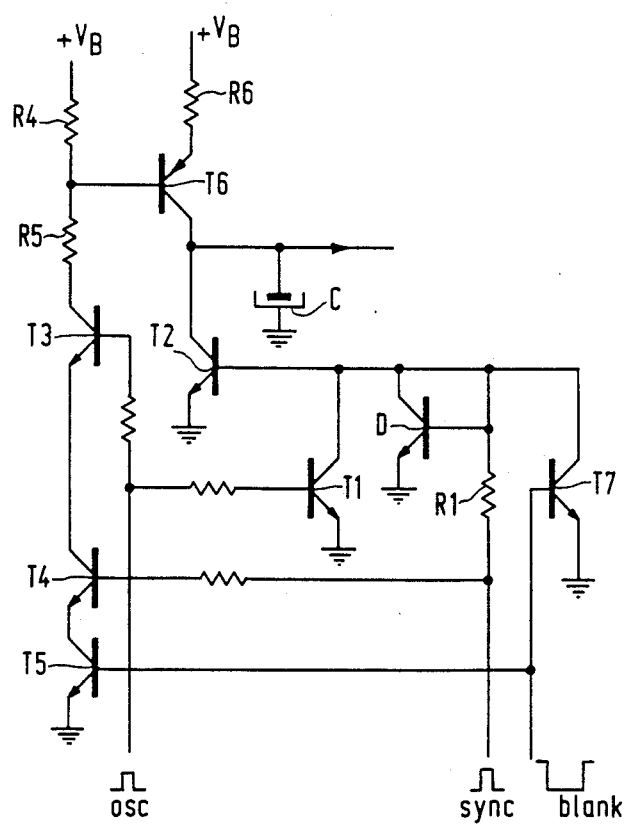

FIG. 5 shows a circuit diagram of a practical circuit which operates in accordance with the principle of FIG. 4. In FIG. 5 the same elements as in FIGS. 1 and 3 are denoted by the same symbols. The series network of two resistors R4 and R5 and of the collector-emitter paths of transistors T3 and T4 and of an npn-transistor T5 is arranged between the positive rail of voltage $V_B$ and ground. The base of a pnp-transistor T6 is connected to the junction point of resistors R4 and R5 while the emitter is connected via a resistor R6 to the said positive rail and the collector is connected to the collector of transistor T2 and to the non-grounded connection of capacitor C. Transistors T1 and T2 and resistor R1 are connected in the same way as in FIG. 1 and diode D is formed with an npn-transistor whose base and collector are connected together. The synchronizing signal is applied to the base of transistor T4 and to the connection of resistor R1 which is not connected to transistor T2 and the oscillator signal is applied to the bases of transistors T1 and T3. The collector of an npn-transistor T7, whose emitter is connected to ground and whose base, along with the base of transistor T5 receives a negatively directed field blanking pulse, is connected to the collector of transistor T1 and the base of transistor T2. The base leads of transistors T1, T3 and T4 incorporate isolating resistors.

FIG. 5 shows that transistor T6 constitutes a charge current source for capacitor C in which the low value of the charge current is determined by resistor R6 and that transistor T2 constitutes a discharge current source for capacitor C in which the high value of the discharge current is determined by resistor R1. Transistor T2 together with transistor T1 forms part of a coincidence detector of type I, which detector is operative (enabled) during the time when transistor T7 is non-conducting, i.e. during the field blanking interval. During the rest of the time transistor T7 conducts so that this detector is then inoperative. Transistors T3 and T4 form part of a coincidence detector of type II which is inoperative during the time when transistor T5 is non-conducting, i.e. during the field blanking interval. During the rest of the time transistor T5 conducts so that this detector is then operative.

During the field trace time transistors T5 and T7 conduit so that transistor T2 does not conduct. In the case of non-coincidence of the line synchronizing and the oscillator pulses transistors T3 and T4 do not conduct either so that transistor T6 does not conduct either and capacitor C is not charged. During the subsequent field blanking interval transistors T5 and T7 are non-conducting so that also transitors T3, T4 and T6 are non-conducting while transistor T2 conducts for a short time during the occurrence of the line synchronizing pulses. The voltage across capacitor C thus remains low. In the case of coincidence of the input pulses, however, transistor T2 does not conduct while transistors T3, T4 and T5 conduct each time during the field trace time so that transistor T6 also conducts and capacitor C recharges. The voltage across the capacitor is thus high. During the field blanking interval the synchronizing pulses are inhibited because transistor T2 is maintained non-conducting each time by the conducting transistor T1 so that capacitor C is not discharged and the voltage thereacross remains high.

When the state already mentioned occurs in which the signal of FIG. 2b is presented instead of a synchronizing signal, capacitor C is each time charged by the conducting transistor T6 during the field trace time, both in the case of coincidence and in the case of non-coincidence, and during the field blanking interval the capacitor is each time discharged by the conducting transistor T2 in both cases. Since the capacitor is discharged to a greater extent during blanking than it is charged during the trace, the voltage across the capacitor is always low. This is the same situation as in the non-coincidence state if the said interference did not occur.

It may be noted that under circumstances the synchronizing signal separator 11 may reach an overload state in which the line frequency keying pulses during which the separator is operative in the synchronous state of the line synchronizing circuit arrangement do not coincide with the line synchronizing pulses but with video signals. In such a case the output voltage of the coincidence circuit will be low, with the result that stage 17 brings separator 11 into the non-synchronous state in which the separator is no longer keyed but is operative throughout the line period. Now separator 11 can leave its overload state, whereafter in the case of a detected coincidence the output voltage of the coincidence circuit increases again up to the switching level of stage 17.

I claim:

1. In a line synchronizing circuit arrangement for a picture display device, a coincidence circuit for establishing a coincidence state between an incoming line synchronizing signal which originates from a synchronizing signal separator and a locally generated line signal which originates from a line oscillator, said coincidence circuit comprising: a coincidence detector having a coincidence state in response to at least partly simultaneous occurrence of said signals, information storage means coupled to an output of the coincidence detector, wherein the coincidence detector, when enabled, is made operative by the incoming line synchronizing signal for modifying in one sense a quantity of information which is stored in the information storage means in the absence of the coincidence state of the detector the operation of said coincidence detector being inhibited by the locally generated line signal in the coincidence state of the coincidence detector whereby the quantity of stored information in the information storage means is modified in the opposite sense and means for enabling the coincidence detector during the occurrence of a field blanking signal.

2. A circuit as claimed in claim 1, wherein the quantity of information is modified at a substantially smaller rate in the coincidence state of the coincidence detector than in the absence of said coincidence state.

3. A circuit as claimed in claim 1, wherein the coincidence detector comprises a first transistor rendered conducting by the locally generated line signal, a second transistor rendered conducting by the line synchronizing signal, and further comprising means coupling the first and second transistors so that conduction of the first transistor cuts off the second transistor.

4. A circuit as claimed in claim 1, wherein the coincidence circuit comprises a second coincidence detector having a coincidence state in response to at least partly simultaneous occurrence of said signals, said second coincidence detector being operated by the incoming line synchronizing signal for modifying the quantity of information which is stored in the information storage means, operation of the second coincidence detector being enabled by the locally generated signal in the coincidence state of the second coincidence detector but not being enabled in the absence of said coincidence state whereby the quantity of stored information in the information storage means is modified in the opposite sense, and means for inhibiting the second coincidence detector during occurrence of the field blanking signal.

5. A circuit as claimed in claim 4, characterized in that the second coincidence detector includes a first transistor rendered conducting by the locally generated line signal and connected so that conduction thereof enables a second transistor rendered conducting by the line synchronizing signal.

6. A circuit as claimed in claim 4, further comprising an inventer stage connected between one of the coincidence detectors and the information storage means.

7. A coincidence circuit as claimed in claim 3 further comprising: a second coincidence detector including third and fourth transistors connected in series with a fifth transistor triggered into cut-off by the field blanking signal, conduction of said third and fourth transistors being controlled by the locally generated line signal and the line synchronizing signal, respectively, a sixth transistor coupled to the information storage means and to said third and fourth transistors to be controlled into conduction, and a seventh transistor triggered into cut-off by the field blanking signal and coupled to the second transistor to control it into a non-conductive state at a time outside of the occurrence of the field blanking signal.

8. A circuit as claimed in claim 4 wherein the quantity of stored information is modified at a substantially lower rate in the coincidence state of the second coincidence detector than in the absence of said coincidence state.

9. A coincidence circuit for determining a coincidence state between first and second periodic pulse-type input signals when said signals occur at least partly simultaneously a given number of successive times during first periodic time intervals, said coincidence circuit comprising: a type I coincidence detector comprising first and second transistors connected together and to an electric storage device, a type II coincidence detector comprising third and fourth transistors connected together and to said electric storage device, first means for coupling said first input signals to respective inputs of the type I and type II coincidence detectors, second means for coupling said second input signals to respective second inputs of the type I and type II coincidence detectors, a current source coupled to the storage device, each of said coincidence detectors being responsive to the first and second input signals to modify an electric quantity stored in the storage device as a function of the degree of coincidence of the first and second input sgnals during said first periodic time intervals, and means for applying a periodic pulse-type control signal to said type I and type II coincidence detectors which simultaneously makes the type I coincidence detector operative and the type II detector inoperative, said type I and type II detectors being inoperative and operative, respectively, in time intervals outside the occurrence of said periodic control signal.

10. A coincidence circuit as claimed in claim 9 wherein said periodic control signal determines said first periodic time intervals.

11. A coincidence circuit as claimed in claim 10 wherein the type I coincidence detector further comprises: means connecting a collector of the first transistor to a base of the second transistor and to said first input of the type I coincidence detector, means connecting a base of the first transistor to the second input of the type I coincidence detector and a collector of the second transistor to the storage device and to the current source, and wherein the type II coincidence detector comprises: means connecting the third and fourth transistors in series between terminals of a source of d.c. supply voltage, base electrodes of the third and fourth transistors comprising the second and first inputs, respectively, of the type II coincidence detector, and means connecting a collector of the third transistor to said storage device.

12. A coincidence circuit as claimed in claim 11 wherein said control signal applying means comprises fifth and sixth switching transistors coupled to the transistor of the type I and type II coincidence detectors, respectively, each of the fifth and sixth transistors having a base electrode coupled to a control input terminal for receiving said periodic pulse-type control signal which switches the fifth and sixth transistors on and off in synchronism.

* * * * *